United States Patent
Doebeli (10) Patent No.: US 11,218,821 B2
(45) Date of Patent: Jan. 4, 2022

(54) METHOD AND SYSTEM FOR FITTING A HEARING DEVICE

(71) Applicant: SONOVA AG, Staefa (CH)

(72) Inventor: Andreas Doebeli, Jona (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/634,704

(22) PCT Filed: Aug. 11, 2017

(86) PCT No.: PCT/EP2017/070495
§ 371 (c)(1),
(2) Date: Jan. 28, 2020

(87) PCT Pub. No.: WO2019/029828
PCT Pub. Date: Feb. 14, 2019

(65) Prior Publication Data
US 2020/0213789 A1 Jul. 2, 2020

(51) Int. Cl.
*H04R 25/00* (2006.01)
*H04W 4/80* (2018.01)
*H04W 12/50* (2021.01)

(52) U.S. Cl.
CPC .......... *H04R 25/70* (2013.01); *H04R 25/554* (2013.01); *H04W 4/80* (2018.02); *H04W 12/50* (2021.01); *H04R 2225/55* (2013.01)

(58) Field of Classification Search
CPC .. H04R 25/70; H04R 25/554; H04R 2225/55; H04W 12/50; H04W 4/80

(Continued)

(56) References Cited

U.S. PATENT DOCUMENTS

2013/0259230 A1* 10/2013 Polo .................. H04W 12/50
380/270
2016/0088424 A1 3/2016 Polo et al.
(Continued)

FOREIGN PATENT DOCUMENTS

| WO | 2015132419 | 9/2015 |
| WO | WO-2015132419 A2 * | 9/2015 ............ H04R 25/70 |
| WO | 2019029828 | 2/2019 |

OTHER PUBLICATIONS

International Search Report and Written Opinion received in International Application No. PCT/US17/070495, dated Apr. 30, 2018.

*Primary Examiner* — Alexander Krzystan
*Assistant Examiner* — Julie X Dang
(74) *Attorney, Agent, or Firm* — ALG Intellectual Property, LLC (57) ABSTRACT

There is provided a method of fitting a hearing device by using a fitting station, wherein: during pairing a long-term key (LTK) is provided as a shared secret to the fitting station and the hearing device; an identity resolving key (IRK) of the fitting station, which is required for generating and resolving a device address of the fitting station, is generated and provided to the hearing device; an IRK of the hearing device, which is required for generating and resolving a device address of the hearing device, is provided to the fitting station; pairing data including the LTK, the fitting station IRK and the hearing device IRK are stored in a database connected to the first fitting station; the LTK and the fitting station IRK are stored in the hearing device; and a fitting session is conducted via a secure connection between fitting station and hearing device.

18 Claims, 7 Drawing Sheets

(58) Field of Classification Search
USPC .................................................. 381/312–314
See application file for complete search history.

(56) References Cited

U.S. PATENT DOCUMENTS

2016/0157078 A1   6/2016  Palin et al.
2016/0262193 A1   9/2016  Hariharan
2017/0201886 A1*  7/2017  Yang ..................... H04W 12/35

* cited by examiner

METHOD AND SYSTEM FOR FITTING A HEARING DEVICE

The disclosure relates to a method of fitting a hearing device by using at least one fitting station, wherein the hearing device and the fitting station(s) communicate via a wireless communication interface.

Typically, during a fitting session, a fitting station, which may be a PC or tablet computer on which a specific fitting software is running, is connected to the hearing assistance device via a wireless communication interface (which also may be referred to as a "fitting device") in order to adjust the hearing device to the individual needs of a user or patient, such as to the individual hearing loss. The wireless interface may utilize, for example, a Bluetooth protocol. For safety reasons, it is desirable that the communication between the fitting station and the hearing device is encrypted, i.e. the exchanged data is encoded using a long-term key shared between the hearing device and the fitting station, and that the fitting station and the hearing device only communicate with authenticated devices.

A "secure connection" is a connection over which data is exchanged that is encrypted using a shared key or wherein a shared key is used to authenticate (typically non-encrypted) data exchanged via the connection, i.e. the receiver of a message can verify that the message was sent by an authorized party.

When connecting two devices using Bluetooth technology for the first time, the two devices to be paired must be brought into a pairable mode which requires to perform a pairing gesture, such as entering a personal identification number (PIN), on both devices. However, since, for example, an ear level hearing device is a relatively small device with a very limited user interface typically comprising small buttons which are difficult to handle, it is desirable to avoid the need for user gestures as far as possible.

WO 2015/132419 A2 relates to a method of fitting a hearing device using a Bluetooth protocol, wherein the fitting software and the hearing device are pre-configured with a long term key as to eliminate the need for a pairing gesture when connecting the hearing device for the first time to a certain fitting station.

US 2016/0088424 A1 relates to a system for facilitating communications in a mesh network, wherein one or more devices in the mesh network may participate as routing nodes to provide range extension for any other devices in the mesh network, and wherein Bluetooth low energy (BTLE) may be used as a physical transport of the mesh network.

US 2016/0157078 A1 relates to a method of establishing a secure relationship between two Bluetooth devices wherein a first wireless carrier and a second wireless carrier are used for exchanging device addresses and paging response messages.

US 2016/0262193 A1 relates to methods for enabling two devices two seamlessly construct or deconstruct a Bluetooth classic connection on an as-needed basis, wherein an existing BTLE connection is used.

It is an object of the disclosure to provide for a method of fitting a hearing device that is convenient for the user even if the fitting session involves more than one fitting station.

According to the disclosure, this object is achieved by a method as defined in claim 1.

In some implementations, the disclosure is beneficial in that, by storing the pairing data including the long term key (LTK), the identity resolving key (IRK) of the fitting station and the IRK of the hearing device, together with an association between the fitting station and the hearing device, in a database connected to the fitting station, such pairing data may be retrieved by another fitting station in a follow-up fitting session. Thereby such other fitting station can establish a secure connection with the hearing device for the follow-up fitting session without the need for a pairing gesture by the user (e.g. the hearing care professional or the end user of the hearing device).

Some implementations of the disclosure are defined in the dependent claims. Hereinafter, examples of the disclosure are illustrated by reference to the attached drawings, wherein:

The drawings have not necessarily been drawn to scale. Similarly, some components and/or operations may be separated into different blocks or combined into a single block for the purposes of discussion of some of the embodiments of the disclosure. Moreover, while the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

A "long-term key" ("LTK") is a digital key which can be used as a shared secret in a fitting station and a hearing device to establish a secure connection between the fitting station and the hearing device.

An "identity resolving key" ("IRK") is a digital key which can used to generate a device address, such as a random resolvable address, from an IRK and a random number.

An "association" between a hearing device and a patient is a logical connection or relationship between the hearing device and the patient; e.g., the patient may be the owner of the hearing device. An "association" between a hearing device and a fitting station is a logical connection or relationship between the hearing device and the fitting station; e.g., the fitting station may have been used or should be used at least once for fitting the hearing device.

Figure 1:
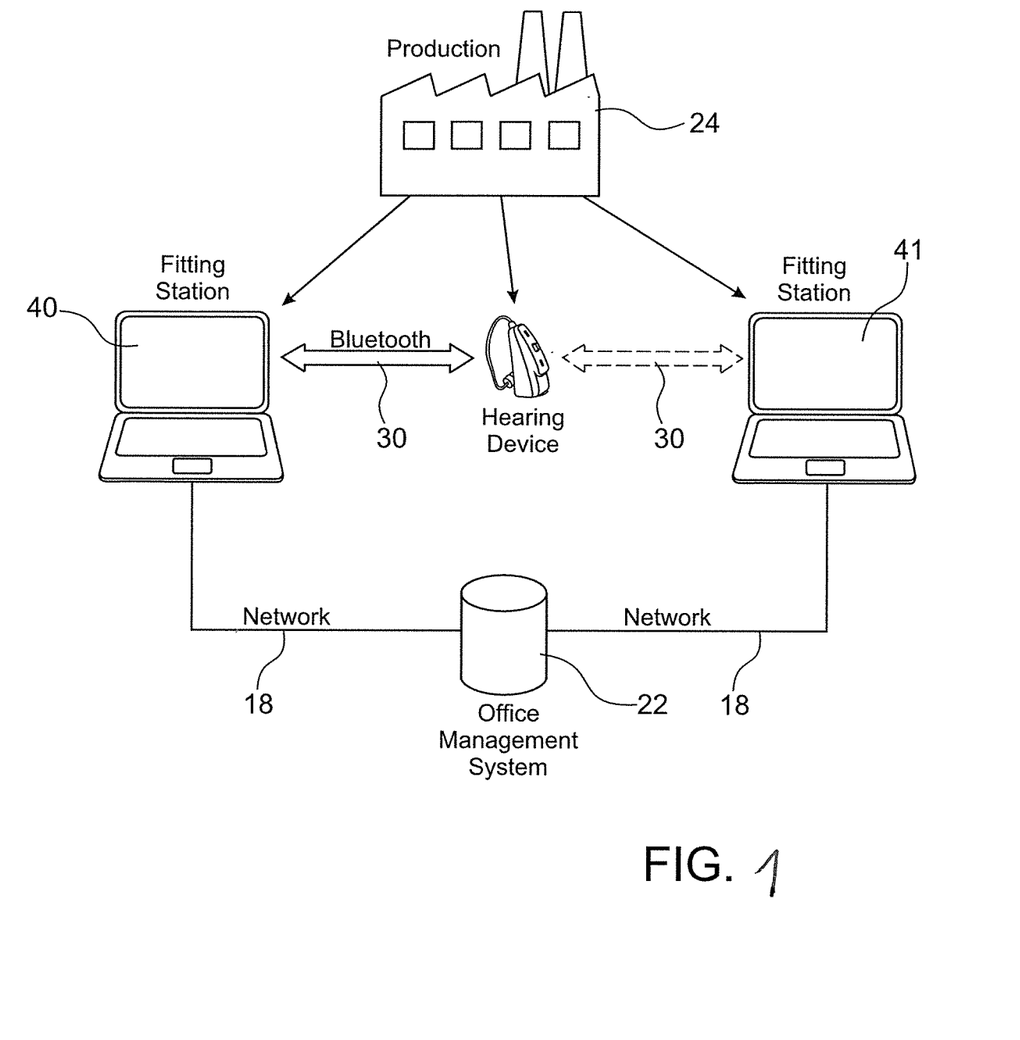
FIG. 1 is a schematic representation of an example of a system for fitting a hearing device.

FIG. 1 is a schematic illustration of an example of a system for conducting a fitting method according to the disclosed technology, comprising a first fitting station 40 and a hearing device 10 which may connect with each other via a Bluetooth link 30. The fitting station 40 typically is a computer device, such as a PC or a tablet computer, on which a specific fitting software is run and which is connected via a network 18 with an office management system which includes a patient database 22. The system further comprises a production facility 24 which serves to produce and pre-configure the fitting software running on the fitting station 40 and the hearing device 10. The fitting station 40 is able to communicate with the hearing device 10 via a Bluetooth link 30 for conducting a fitting session in order to individually adjust the hearing assistance device 10 to the individual preferences and needs of the user of the hearing assistance device 10. Such fitting session may include feedback from the user while wearing the hearing assistance device 10.

In general, the hearing assistance device 10 may communicate with several fitting stations, such as with the first fitting station 40 and with a second fitting station being 41. Such situation may occur in larger offices of a hearing care provider or with a hearing care provider running several offices. The fitting stations 40, 41 are connected to the same office management system (database 22) via the network connection 18. A typical situation for such systems comprising a plurality of fitting stations 40, 41 is that the first fitting session is performed via a first fitting station 40, and a later second fitting session, i.e. a follow-up fitting session, is performed via a second fitting station 41 in the same office or in a different office, with the same hearing assistance device 10 being involved.

Figure 2:
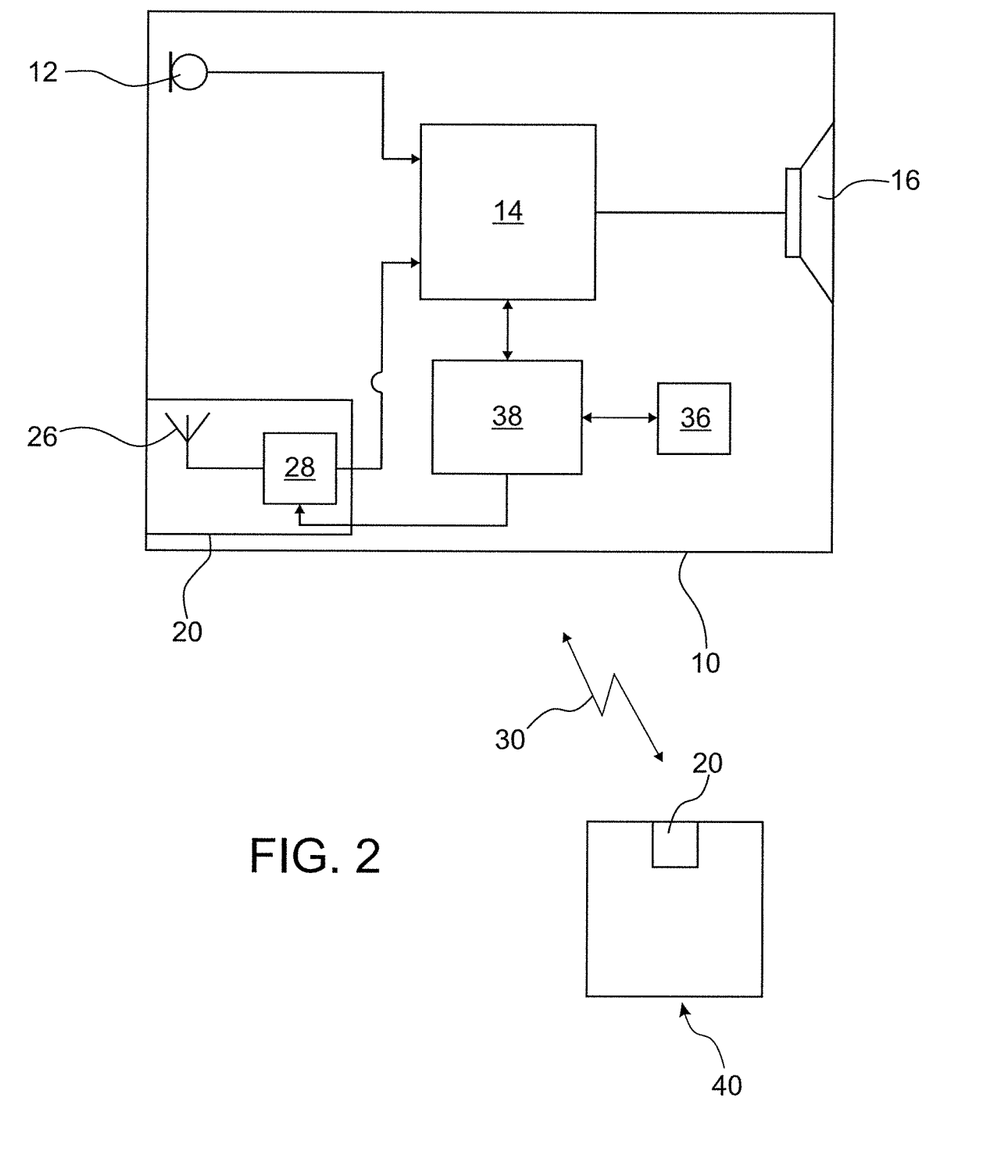
FIG. 2 is an example of a schematic block diagram of components of the system of FIG. 1.

An example of a block diagram of the fitting station 40 and the hearing assistance device 10 is shown in FIG. 2, wherein the hearing assistance device 10 is a hearing aid comprising a microphone arrangement 12 for capturing audio signals from ambient sound, an audio signal processing unit 14 for processing the captured audio signals and an electro-acoustic output transducer (loudspeaker) 16 for stimulation the user's hearing according to the processed audio signals.

The hearing aid 10 also comprises a wireless interface 20 comprising an antenna 26 and a transceiver 28. The interface 20 is provided for enabling wireless data exchange between the first hearing aid 10 and other devices, such as a second hearing aid of a binaural system, an audio streaming device, or a remote microphone, via a wireless link. The interface 20 is also provided for data exchange via a wireless link 30 with a fitting station 40, 41 comprising or being connected to a wireless interface 20. The wireless interface 20 of the fitting station 40, 41 also may be referred to as a fitting device 20.

In some implementations, the interface 20 may be adapted to operate in a frequency range of 0.38 GHz to 5.825 GHz. In some implementations, the interface 20 can operate at frequencies around 2.4 GHz in the industrial, scientific, and medical (ISM) band. In some implementations, the interface 20 is a Bluetooth interface, such as a BTLE interface.

The hearing aid 10 also comprise a controller 38 for controlling operation of the hearing aid 10, with the controller 38 acting on the signal processing unit 14 and the transceiver 28, and a memory 36 for storing data required for operation of the hearing aid 10 and data required for operation of the interface 20, such as pairing/network data.

The hearing device typically is an ear level device and forms part of a binaural hearing system. For example, the hearing device may be a hearing aid, such as a BTE (behind the ear), ITE (in the ear) or CIC (completely in the channel) hearing aid, or an auditory prosthesis, such as a cochlear implant. Alternatively, the hearing assistance device may be a wireless headphone which requires or enables fitting in the sense of individual adjustment.

Figure 3:
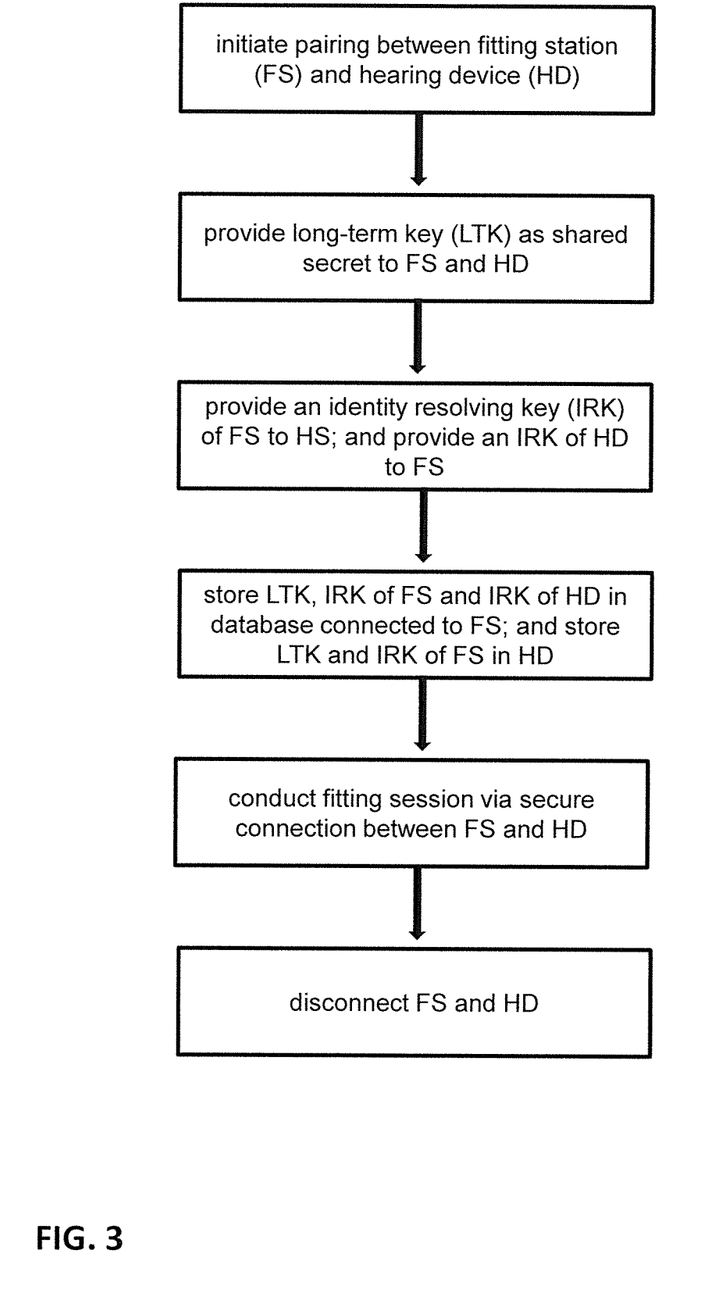
FIG. 3 is a flow diagram schematically illustrating an example of a fitting process which may utilize the system of FIG. 1.

FIG. 3 is a flow diagram schematically illustrating an example of a process which may be utilized in the system of FIG. 1 for fitting the hearing device via one of the fitting stations 40, 41. First, a fitting session is initiated by initiating pairing between the fitting station and the hearing device. A long-term key (LTK) is provided as a shared secret to the fitting station and the hearing device, the LTK being suitable for establishing a wireless secure connection between the fitting station and the hearing device. An identity resolving key (IRK) of the fitting station is generated and is provided to the hearing device; this IRK is required for generating and resolving a device address of the fitting station. Further, an IRK of the hearing device is provided to fitting station; this IRK is required for generating and resolving a device address of the hearing device. Pairing data including the LTK, the IRK of the fitting station and the IRK of the hearing device, are stored, together with an association between the first fitting station and the hearing device, in the database connected to the fitting station.

The LTK and the IRK of the fitting station are also stored in the hearing device. In some implementations, such data storing on the database and on the hearing device, respectively, may be persistent. A fitting session is conducted via a secure connection between the first fitting station and the hearing device via the wireless communication interfaces. At the end of the fitting session, the fitting station and the hearing device are disconnected.

Figure 4:
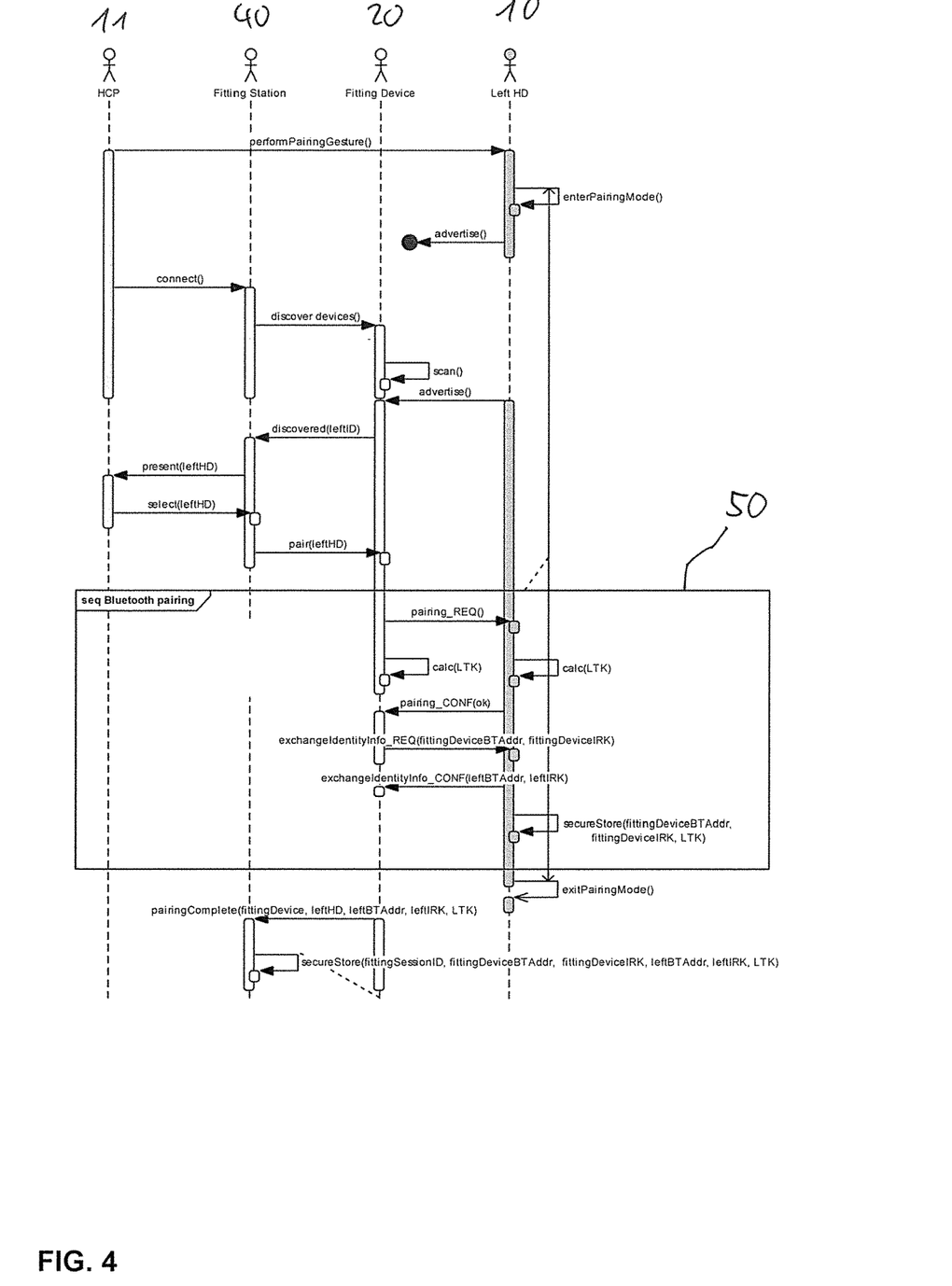
FIG. 4 is an example of a flowchart of a pairing process of a fitting station and a hearing device in the system of FIG. 1.

A more detailed illustration of the pairing process of a fitting station and a hearing device in the system of FIG. 1 is found in FIG. 4.

Before a fitting session with the hearing assistance device 10 can be performed, it is necessary to pair the fitting station 40 with the hearing device 10.

When a certain hearing device 10 is used for the first time with a certain fitting station 40, it is necessary to pair the fitting station 40 with the hearing device 10 before a fitting session can be performed. The pairing process may be initiated by the hearing care professional (HCP) 11 who performs a pairing gesture on the hearing device 10 ("performPairingGesture" in FIG. 4) and on the fitting station 40 ("connect"), whereupon the hearing device 10 starts advertising ("enterPairingMode"; "advertise") so that it can be discovered by the fitting station 40 via the interface/fitting device 20 ("discover"; "scan"; "discover(leftID)"; "present (leftHD)"). The HCP 11 then may select the discovered hearing device 10 for pairing ("select(leftHD)"; "pair (leftHD"), so that a Bluetooth pairing procedure 50 is carried out between the fitting station 40 and the hearing device 10 (FIG. 4 schematically illustrates some elements of such pairing procedure).

Such pairing procedure includes the generation of a long-term key (LTK) ("calc(LTK") which is used as a shared secret in the fitting station 40 and the hearing device 10 and which can be used for establishing a secure connection between the fitting station 40 and the hearing device 10.

The pairing procedure also serves to exchange identity resolving keys (IRKs) between the fitting station 40 and the hearing device 10. Generally, an IRK is used to generate a device address, such as a random resolvable address, which is generated from the IRK and a random number. For example, the device address of the hearing device 10 may be generated by passing the IRK of the hearing device to the "initialize" function of BTLE. Random resolvable addresses are dynamically generated at run time and are the basis of the privacy feature of BTLE; such device address may be changed often—even during the lifetime of a connection—to avoid that the device is identified and tracked by an unknown scanning device. Only other devices that possess the IRK distributed by the device using a private resolvable address is actually able to resolve that address so that it is enabled to identify the device. The IRK of the hearing device 10 may be provided to the hearing device 10 out-of-band, for example during manufacturing at the production facility 24. During the pairing procedure 50 the IRK of the hearing device 10 may be transmitted from the hearing device 10 to the fitting station 40 once a secure connection using the LTK has been established ("exchangeIdentityInfo_REQ(fitting DeviceBTAddr, fittingdeviceIRK") "exchangeIdentityInfo_CONF(leftBTAddr, leftIRK)").

The IRK of the fitting station 40 may be generated by the fitting station upon initializing of a new fitting session by the HCP 11, with a random number generator being used. During the pairing procedure 50 the IRK generated by the fitting station 40 is transmitted to the hearing device 11 via a secure connection using the LTK.

In addition to sharing the LTK and exchanging the IRKs, also the public Bluetooth ("BT") address may be exchanged in the pairing procedure 50 between the fitting station 40 and the hearing device 10.

The IRK of the fitting station 40 is fitting session-specific in the sense that this IRK is to be used not only in the initial fitting session but also in any follow-up fitting sessions relating to the same hearing device 10 (in this regard, the initial fitting session and the follow-up fitting sessions may be considered as forming part of the same fitting session).

For initializing the fitting session, the HCP 11 also creates an association between the hearing device 10 and a certain user/patient. Such association, including patient information, is stored in the database 22 to which the fitting station 40 is connected via the network connection 18, together with the pairing data, including the LTK, the IRK of the fitting station, the IRK of the hearing device 10 and an association between the fitting station 40 and the hearing device 10 ("secureStore(fittingSeesionID, fittigDeviceBTAddr, fittingDeviceIRK, leftBTAddr, leftIRK, LTK)".

Further, the LTK and the IRK of the fitting station 40 are stored in the hearing device 10 ("secureStore(fittingDeviceBTAddr, fittingDeviceIRK, LTK)"). The fitting station 40 can identify itself as a fitting station to the hearing device 10 prior to pairing, so that the IRK of the fitting station 10 and the LTK may be stored in a special location of the pairing table of the hearing device 10 which is reserved for fitting stations (this area of the memory 36 is indicated at 36-1 in FIGS. 5 to 11).

Once the pairing process is completed, a fitting session may be conducted while a secure connection using the LTK is established between the fitting station 40 and the hearing device 10. Once no further continuation of the fitting session is desired by the HCP 11, the fitting station 40 and the hearing device 10 are disconnected.

FIGS. 5 to 11 are schematic illustrations of various use situations of a system like that of FIG. 1.

Figure 5:
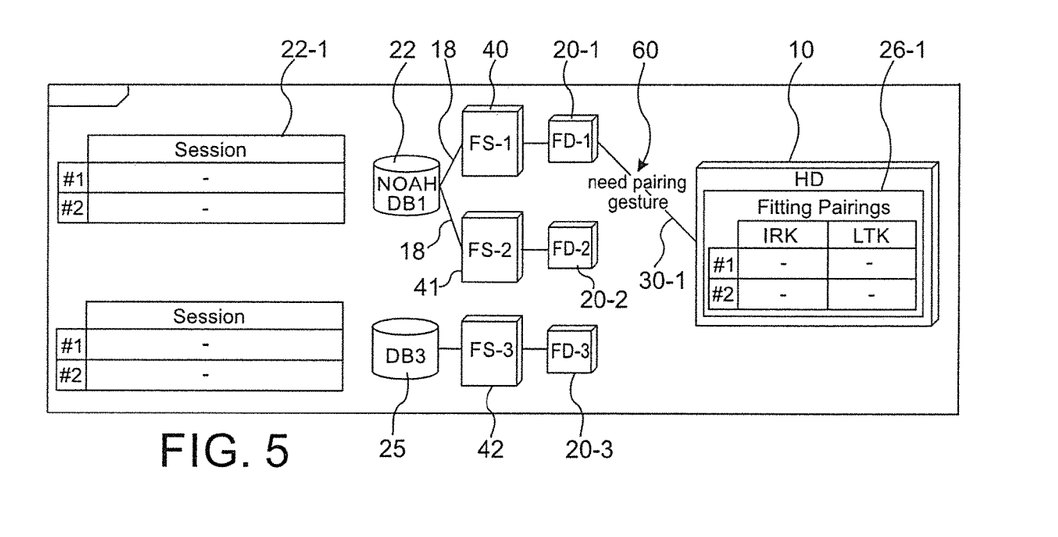
FIGS. 5 to 11 are schematic illustrations of various use situations of the system of FIG. 1.

FIG. 5 is an illustration of a situation when the hearing device 10 is connected for the first time with the fitting station 40 including an interface/fitting device 20-1, wherein pairing is initialized by a pairing gesture 60 by a HCP, which results in a wireless connection 30-1 being established.

Figure 6:
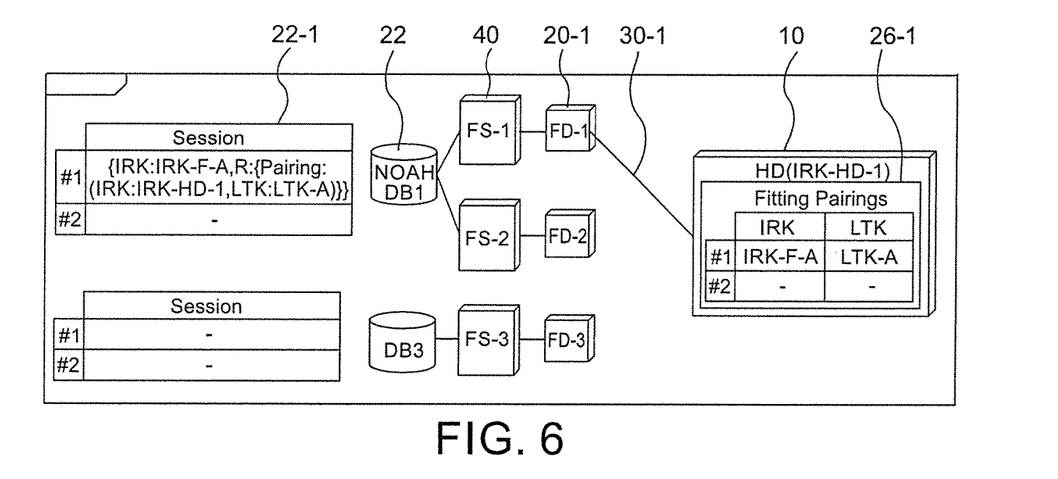

FIG. 6 illustrates a situation after pairing is completed, wherein the IRK of the fitting station 40 and the LTK are stored in a fitting station pairing table 26-1 of the hearing device memory 26. The IRK of the hearing device 10, the IRK of the fitting station 40, the LTK and the association between the fitting station 40 and the hearing device 10 are stored in a part 22-1 of the database 22 to which the fitting station 40 is connected to.

Figure 7:
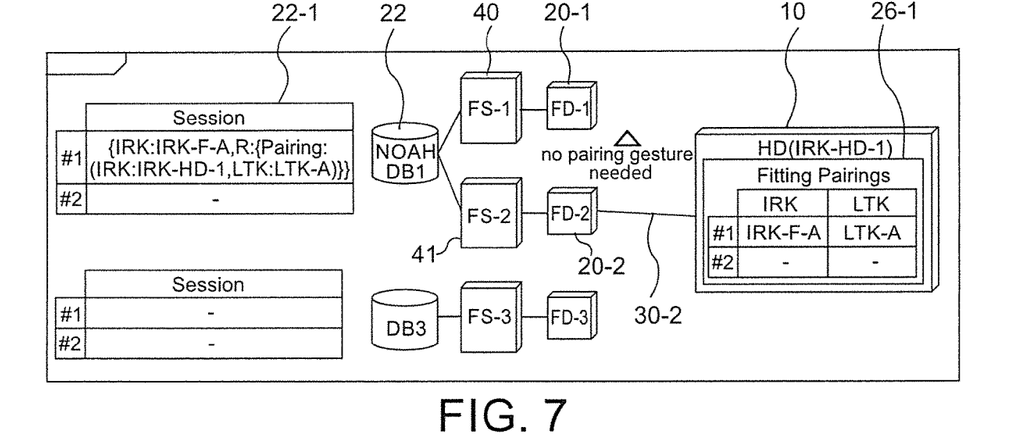

FIG. 7 illustrates a situation wherein a follow-up fitting session is to be conducted with the hearing device 10, wherein, however, the hearing device 10 is to be connected to a second fitting station 41 comprising or being connected to a wireless interface/fitting device 20-2 so as to establish a wireless secure connection 30-2 between the second fitting station 41 and the hearing device 10. The second fitting station 41 is connected to the database 22 and retrieves the pairing data of the initial/first fitting session in which the first fitting station 40 was used from the database 22. Such retrieved pairing data includes the IRK of the first fitting station 40, the IRK of the hearing device 10 and the LTK. Since thereby both the second fitting station 41 and the hearing device 10 are in possession of the LTK and in possession of the IRK of the respective other device, no pairing gesture is needed in order to connect the second fitting station 41 and the hearing device 10. In particular, the hearing device 10, by using the IRK of the fitting station 40, is able to resolve the random resolvable device address transmitted by the second fitting station 41, and the second fitting station 41 is able to resolve the random resolvable device address transmitted by the hearing device 10 by using the IRK of the hearing device 10 (the random resolvable device addresses are previously generated in the fitting station 41 and the hearing device 10 by using the respective IRK).

For example, the hearing device 10 generates its device address by using its IRK and resolves the device address received from the second fitting station 41 by using the IRK of the first fitting station 41 as stored in the fitting station pairing table 26-1, and the second fitting station 41 uses the IRK of the first fitting station 40 as retrieved from the database 22 for generating its device address and uses the IRK of the hearing device 10 as retrieved from the database 22 for resolving the device address received from the hearing device 10.

Once a secure connection 30-2 is thereby established, a follow-up fitting session can be conducted; in order to terminate the follow-up fitting session, the second fitting session 41 and the hearing device 10 may be disconnected.

Accordingly, by using the database 22, the pairing between the first fitting station 40 and the hearing device 10 actually can be transferred to the second fitting station 41 without the need for again performing a pairing gesture on the hearing device 10. This allows to actually replace the first fitting station 40—or to reassemble the first fitting station 40—as long as the hardware and software requirements correspond to the specifications.

Figure 8:
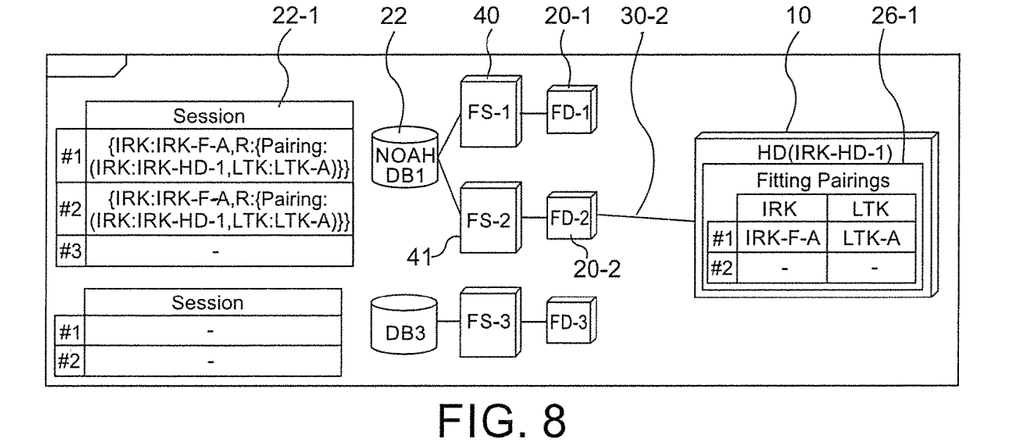

FIG. 8 illustrates a situation after the follow-up fitting session illustrated in FIG. 7, wherein the pairing data of the first fitting session is written to the database as the data for the second fitting session.

Figure 9:
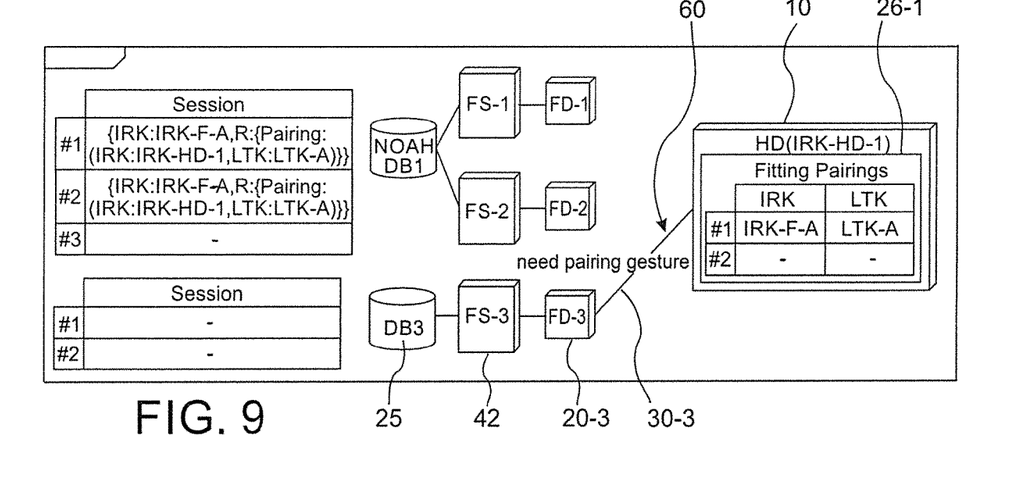
Figure 10:
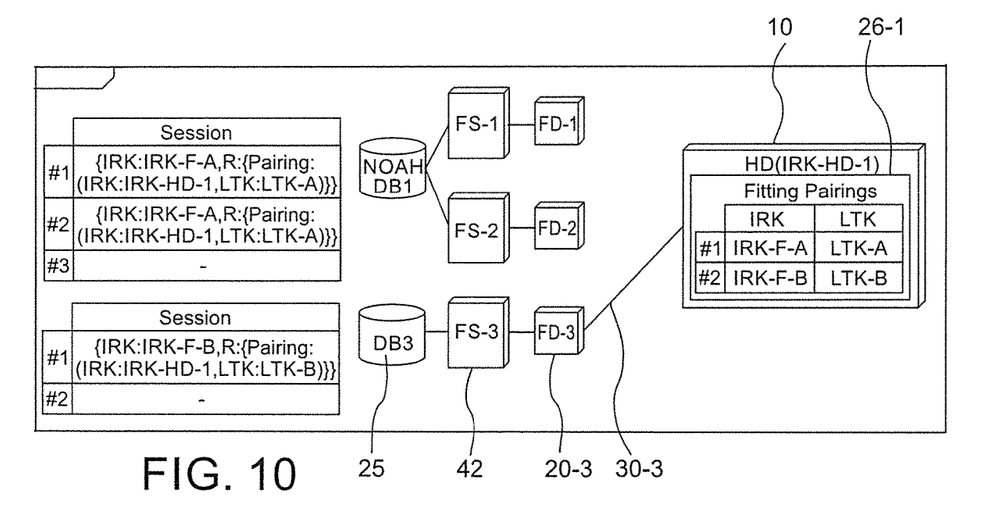
Figure 11:
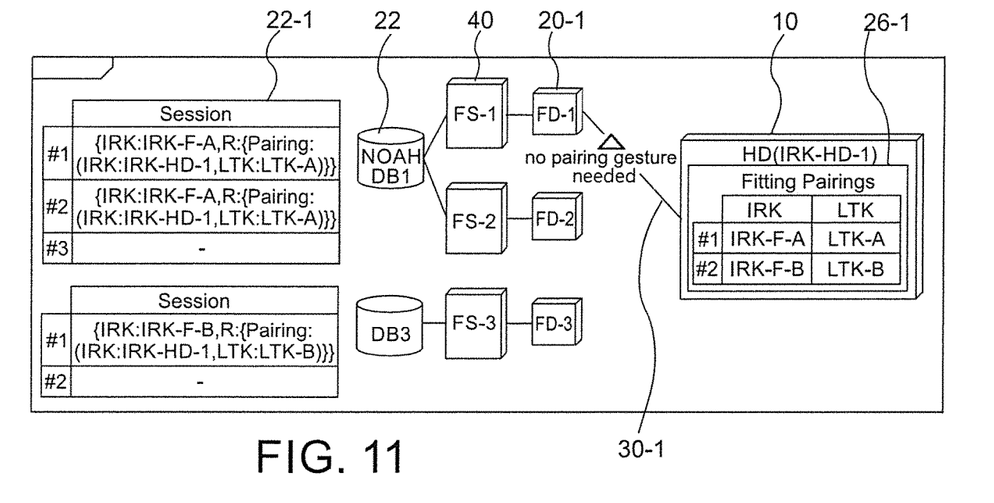

In FIGS. 9 and 10 a situation is illustrated, wherein a third fitting station 42, which is not connected to the database 22, is used for initializing a fitting session with the hearing device 10, which requires a pairing gesture to be performed on the hearing device 10 for pairing the hearing device 10 with the third fitting station 42 so as to establish a secure connection 30-3. As illustrated in FIG. 11, once pairing between the third fitting station 42 in the hearing device 10 completed, pairing data concerning this pairing is written to a database 25 connected to the third fitting station 42, and the IRK of the third fitting station 42 and the LTK resulting from the pairing with the third fitting station 42 is stored in the fitting station pairing table 26-1 of the hearing device 10.

FIG. 11 illustrates a situation, wherein the hearing device 10 is to be again connected to the first fitting station 40 in order to conduct a follow-up fitting session. In this case, as in the case of the connection with the second fitting station 41 illustrated in FIGS. 7 and 8, there is no need for a pairing gesture to be performed on the hearing device 10, since all pairing data is available in the hearing device 10 in the fitting station pairing table 26-1 and in the first fitting station 41 has retrieved from the database 22.

While the above described fitting methods have been described for one hearing device 10, it is to be understood that the process may be applied ion a sequential manner to binaural systems comprising a pair of hearing devices.

The techniques introduced here can be implemented using special-purpose hardware (e.g., circuitry), as programmable circuitry appropriately programmed with software and/or firmware, or as a combination of special-purpose and programmable circuitry. Hence, implementations may include a machine-readable medium having stored thereon instructions which may be used to program a computer (or other electronic devices) to perform a process. The machine-readable medium can include optical disks, compact disc read-only memories (CD-ROMs), magneto-optical disks, ROMs, random access memories (RAMS), erasable programmable read-only memories (EPROMs), electrically erasable programmable read-only memories (EEPROMs), magnetic or optical cards, flash memory, or other type of media/machine-readable medium suitable for storing electronic instructions. Machine-readable medium includes a non-transitory computer-readable medium (CRM) storing instructions that can be executed by a processor to operate or control a device. In some embodiments, the devices disclosed in FIGS. 1 and 2 perform some or all of the operations described in FIGS. 3 to 11.

The phrases "in some implementations," "according to some implementations," "in the implementations shown," "in other implementations," and generally mean the particular feature, structure, or characteristic following the phrase is included in at least one implementation of the disclosure, and may be included in more than one implementation. In addition, such phrases do not necessarily refer to the same embodiments or different implementations.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The invention claimed is:

1. A method of fitting a hearing device, comprising:
   initiating a fitting session by initiating pairing between a first fitting station and the hearing device, each of the hearing device and the first fitting station having a wireless communication interface using a communication protocol;
   providing a long-term key (LTK) as a shared secret to the first fitting station and the hearing device, the LTK being suitable for establishing a secure connection between the first fitting station and the hearing device via the communication interfaces;
   generating an identity resolving key (IRK) of the first fitting station, the IRK of the first fitting session required for generating and resolving a device address of the first fitting station;
   providing the IRK of the first fitting station to the hearing device;
   providing an IRK of the hearing device to the first fitting station, the IRK of the hearing device required for generating and resolving a device address of the hearing device;
   storing pairing data including the LTK, the IRK of the first fitting station and the IRK of the hearing device, together with an association between the first fitting station and the hearing device, in a database connected to the first fitting station, the database accessible by a second fitting station while the first fitting station is disconnected from the hearing device and during a follow-up fitting session in which the second fitting session retrieves the pairing data stored in the database to perform a pairing between the second fitting station and the hearing device.

2. The method of claim 1, wherein the protocol is Bluetooth LE.

3. The method of claim 2, wherein the device address of the hearing device is a random resolvable address.

4. The method of claim 3, wherein the device address of the hearing device is generated by passing the IRK of the hearing device to the Bluetooth LE "initialize" function.

5. The method of claim 2, wherein the device address of the first fitting station is a random resolvable address.

6. The method of claim 2, wherein the public Bluetooth addresses of the first fitting station and the hearing device are exchanged between the first fitting station and the hearing device during pairing.

7. The method of claim 1, wherein the IRK of the hearing device is provided to the hearing device out-of-band.

8. The method of claim 7, wherein the IRK of the hearing device is provided to the hearing device during manufacturing.

9. The method of claim 7, wherein the IRK of the hearing device is provided from the hearing device to the first fitting station via a secure connection between the wireless interfaces.

10. The method of claim 1, wherein the IRK of the first fitting station is generated by the first fitting station utilizing a random number generator.

11. The method of claim 1, wherein the IRK of the first fitting station is provided from the first fitting station to the hearing device via a secure connection between the wireless interfaces.

12. The method of claim 1, wherein the first fitting station identifies itself as a fitting station to the hearing device prior to pairing, and wherein the IRK of the first fitting station and the LTK are stored in a special location of a pairing table of the hearing device reserved for fitting stations.

13. The method of claim 1, wherein an association between the hearing device and a certain user is stored in the database.

14. The method of claim 1, wherein pairing between the first fitting station and the hearing device is initiated by a user gesture on the first fitting station and the hearing device.

15. The method of claim 1, wherein the LTK is generated during pairing.

16. The method of claim 1, wherein the method further comprises initiating the follow-up fitting session on the second fitting station comprising a wireless communication interface using said communication protocol by:
   connecting the second fitting station to the database;
   retrieving, by the second fitting station, the pairing data from the database;

generating, in the second fitting station, a device address of the second fitting station by using the IRK of the first fitting station, and generating, in the hearing device, a device address by using the IRK of the hearing device;

exchanging the device addresses between the second fitting station and the hearing device;

resolving, in the second fitting station, the device address received from the hearing device by using the IRK of the hearing device, and resolving, in the hearing device, the device address received from the second fitting station by using the IRK of the second fitting station;

connecting the second fitting station and the hearing device via the communication interfaces by using the retrieved pairing information and the resolved device addresses.

17. The method of claim 1, wherein the first fitting station comprises a PC and a fitting device connected to the PC and comprising the wireless interface.

18. A non-transitory computer-readable medium storing a computer program that, when executed, direct a processor to:

initiate a fitting session by initiating pairing between a first fitting station and a hearing device, each of the hearing device and the first fitting station having a wireless communication interface using a communication protocol;

provide a long-term key (LTK) as a shared secret to the first fitting station and the hearing device, the LTK being suitable for establishing a secure connection between the first fitting station and the hearing device via the communication interfaces;

generate an identity resolving key (IRK) of the first fitting station, the IRK of the first fitting session required for generating and resolving a device address of the first fitting station;

provide the IRK of the first fitting station to the hearing device;

provide an IRK of the hearing device to the first fitting station, the IRK of the hearing device required for generating and resolving a device address of the hearing device;

store pairing data including the LTK, the IRK of the first fitting station and the IRK of the hearing device, together with an association between the first fitting station and the hearing device, in a database connected to the first fitting station, the database accessible by a second fitting station while the first fitting station is disconnected from the hearing device and during a follow-up fitting session in which the second fitting session retrieves the pairing data stored in the database to perform a pairing between the second fitting station and the hearing device.

* * * * *